US011933095B2

(12) United States Patent
Lee

(10) Patent No.: US 11,933,095 B2
(45) Date of Patent: Mar. 19, 2024

(54) COUPLING SYSTEM

(71) Applicant: ILLINOIS TOOL WORKS INC., Glenview, IL (US)

(72) Inventor: Joel R. Lee, Peotone, IL (US)

(73) Assignee: Illinois Tool Works Inc., Glenview, IL (US)

( * ) Notice: Subject to any disclaimer, the term of this patent is extended or adjusted under 35 U.S.C. 154(b) by 74 days.

(21) Appl. No.: 17/632,607

(22) PCT Filed: Aug. 19, 2020

(86) PCT No.: PCT/US2020/047024
§ 371 (c)(1),
(2) Date: Feb. 3, 2022

(87) PCT Pub. No.: WO2021/034946
PCT Pub. Date: Feb. 25, 2021

(65) Prior Publication Data
US 2022/0275672 A1 Sep. 1, 2022

Related U.S. Application Data

(60) Provisional application No. 62/888,600, filed on Aug. 19, 2019.

(51) Int. Cl.
*E05D 7/12* (2006.01)
*E05D 7/10* (2006.01)

(52) U.S. Cl.
CPC .......... *E05D 7/121* (2013.01); *E05D 7/1055* (2013.01)

(58) Field of Classification Search
CPC ... E05D 11/1007; E05D 7/1066; E05D 7/121; E05D 7/1055; E05D 7/1077; E05D 7/1061
USPC .......................................................... 16/388
See application file for complete search history.

(56) References Cited

U.S. PATENT DOCUMENTS

| 2,244,276 | A | * | 6/1941 | Ward | ........................ E05D 3/02 16/388 |
| 3,178,761 | A | * | 4/1965 | Restaino | ................ D05B 75/06 16/257 |
| 3,295,714 | A | * | 1/1967 | Di Addario | ........... E05D 7/1077 16/257 |

(Continued)

OTHER PUBLICATIONS

International Search Report and Written Opinion for PCT/US2020/047024, dated Nov. 2, 2020 (15 pages).

*Primary Examiner* — Emily M Morgan
(74) *Attorney, Agent, or Firm* — Quarles & Brady LLP

(57) ABSTRACT

A clip assembly is provided for a storage system, and includes a receiver clip and a floor clip. The receiver clip includes a base section and a support section, the support section having a main surface and a pair of arm extensions extending from opposing edges of the main surface to define a receiving region. The arm extensions each define a guiding ramp and a securing cavity. The floor clip includes a lower section and an upper section, the lower section comprising knobs extending from sidewalls thereof. The securing cavities of the receiver clip are configured to receive and retain at least a portion of the knobs of the floor clip so that the floor clip is hingedly connected to the receiver clip by the knobs, and the floor clip may pivot relative to the receiver clip between an open position and a closed position.

16 Claims, 13 Drawing Sheets

(56) References Cited

U.S. PATENT DOCUMENTS

| | | | | |
|---|---|---|---|---|
| 3,333,726 | A | * | 8/1967 | Belanger .............. E05D 7/1072 |
| | | | | 16/257 |
| 4,302,866 | A | | 12/1981 | Irvin |
| 4,863,062 | A | * | 9/1989 | Holliday .............. B65D 21/062 |
| | | | | 206/506 |
| 5,065,887 | A | | 11/1991 | Schuh et al. |
| 5,911,264 | A | * | 6/1999 | Smrke .................. E05D 15/502 |
| | | | | 16/258 |
| 9,260,898 | B2 | * | 2/2016 | Soma ..................... E05D 7/105 |
| 10,590,687 | B1 | * | 3/2020 | Cifers ........................ E05D 7/12 |
| 2002/0178545 | A1 | * | 12/2002 | Cardona ................ E05D 9/005 |
| | | | | 16/262 |
| 2008/0223601 | A1 | * | 9/2008 | Johnson ................ H02G 3/088 |
| | | | | 174/67 |
| 2017/0306672 | A1 | | 10/2017 | Romero Contreras et al. |
| 2018/0051497 | A1 | | 2/2018 | Wilke |
| 2018/0162292 | A1 | | 6/2018 | Wertich et al. |
| 2020/0392773 | A1 | * | 12/2020 | Valencia Flores ........ B60R 7/04 |

* cited by examiner

COUPLING SYSTEM

CROSS REFERENCE TO RELATED APPLICATIONS

This application represents the United States National Stage filing of International Patent Application No. PCT/US2020/047024, filed on Aug. 19, 2020, which relates to and claims priority to U.S. Provisional Application No. 62/888,600 filed on Aug. 19, 2019, which is hereby incorporated by reference in its entirety.

FIELD OF THE DISCLOSURE

Embodiments of the present disclosure generally relate to coupling systems, and more particularly, to fastening or clip assemblies that may be used to hingedly connect components of assemblies.

BACKGROUND

Vehicle manufacturers have been working to maximize cargo storage in automobiles. One common solution for providing additional storage space is by including floor cargo storage. More specifically, automobiles are designed with storage space below the floor. Accordingly, the floors of the automobiles are configured to be removed to expose the cargo storage space. In some designs, the floor may be hingedly attached to the vehicle body so that the floor may pivot away from the body to expose the cargo storage space. However, these existing storage systems commonly require the use of tools and fasteners for installation, which creates a tedious and timely installation process. Further, because fasteners, such as screws or rivets, are commonly required, existing systems cannot be disassembled. That is, once the floor is hingedly attached to the cargo storage space, it may not be capable of disassembly, which may inhibit or complicate required maintenance to the vehicle. Therefore, a need exists for a storage system that uses a fastening assembly that is capable of being assembled without the use of tools and/or additional fasteners, and is capable of being assembled and disassembled repeatedly.

SUMMARY

In one embodiment, a clip assembly for a storage system is disclosed. The clip assembly includes a receiver clip and a floor clip. The receiver clip includes an integrally formed body comprising a base section and a support section. The support section has a main surface and a pair of arm extensions extending from opposing edges of the main surface to define a receiving region, and the arm extensions each define a guiding ramp and a securing cavity. The floor clip includes an integrally formed body comprising a lower section and an upper section. The lower section has a first wall and a second wall connected by opposing sidewalls, and knobs extending from the sidewalls. The securing cavities of the receiver clip are configured to receive and retain at least a portion of the knobs of the floor clip, and the receiving region is configured to receive at least a portion of the floor clip. Further, the floor clip is configured to be hingedly connected to the receiver clip by the knobs such that the floor clip may pivot relative to the receiver clip between an open position and a closed position.

In another embodiment, a clip assembly for a storage system is disclosed. The storage system includes a door and a storage unit, and the storage unit defines a storage cavity. The clip assembly includes a receiver clip and an attachment clip. The receiver clip includes a body comprising a support section with a main surface and arm extensions extending from the main surface to define a receiving region. The arm extensions each define a guiding ramp and a securing cavity, the guiding ramp being a recessed channel that extends from a front face of the receiver clip to the securing cavity. The attachment clip includes a body comprising a lower section with a first wall and a second wall connected by opposing sidewalls. The lower section further includes cylindrical knobs extending from the sidewalls thereof. The securing cavities of the receiver clip are configured to receive and retain at least a portion of the knobs of the attachment clip, and the receiving region is configured to receive at least a portion of the attachment clip. Further, the attachment clip is hingedly connected to the receiver clip by the knobs such that the attachment clip may pivot relative to the receiver clip, and the clip assembly is configured to hingedly connect the door to the storage unit of the storage system such that the door may pivot relative to the storage unit.

In another embodiment, a cargo storage system for a vehicle is disclosed. The cargo storage system includes a storage assembly and a clip assembly. The storage assembly includes a storage unit and a floor door, the storage unit defining a storage cavity and an opening, and the floor door defining an opening. The clip assembly includes a first clip and a second clip. The first clip includes an integrally formed body having a base section and a support section. The support section has a main surface and a pair of arm extensions extending from opposing edges of the main surface to define a receiving region, the arm extensions each defining a guiding ramp and a securing cavity. The base section of the first clip extends from the support section to a free end and is configured for insertion into an opening of the storage unit. The base section includes protrusions disposed on an outer wall thereof, the protrusions being configured to deflect from an at-rest position as the base section passes through the opening of the storage unit. Further, the protrusions are configured to return toward the at-rest position when the base section is inserted into the opening so that the protrusions engage the storage unit and secure the first clip to the storage unit. The second clip includes an integrally formed body comprising a lower section and an upper section. The lower section includes a first wall and a second wall connected by opposing sidewalls, and knobs extending from the sidewalls. The upper section includes a stem that extends from the first wall to a widened end, the stem and the widened end being configured for insertion through the opening of the floor door to secure the second clip to the floor door. The securing cavities are configured to receive and retain at least a portion of the knobs of the second clip, and the receiving region is configured to receive at least a portion of the second clip. Further, the second clip is configured to be hingedly connected to the first clip by the knobs such that the second clip and the floor door can pivot relative to the first clip and the storage unit.

BRIEF DESCRIPTION THE DRAWINGS

Figure 1:
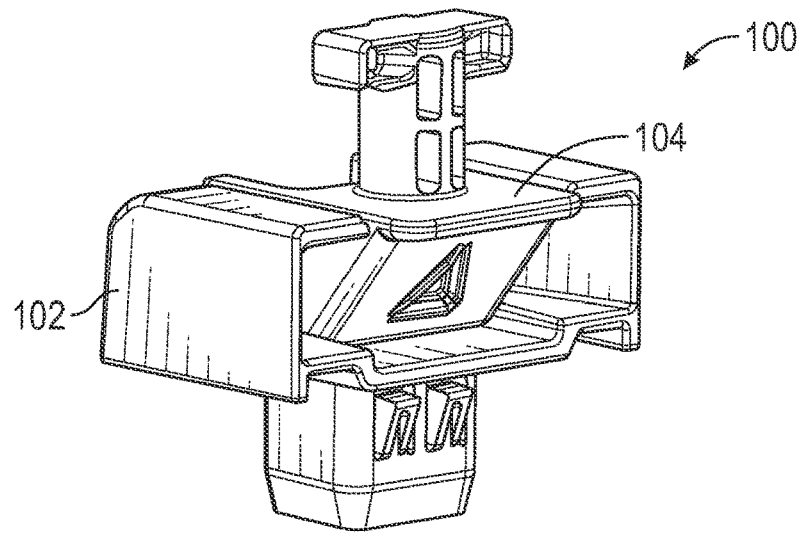
FIG. 1 is an isometric view of a clip assembly including a receiver clip and a floor clip, according to an embodiment of the disclosure.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION

Figure 2:
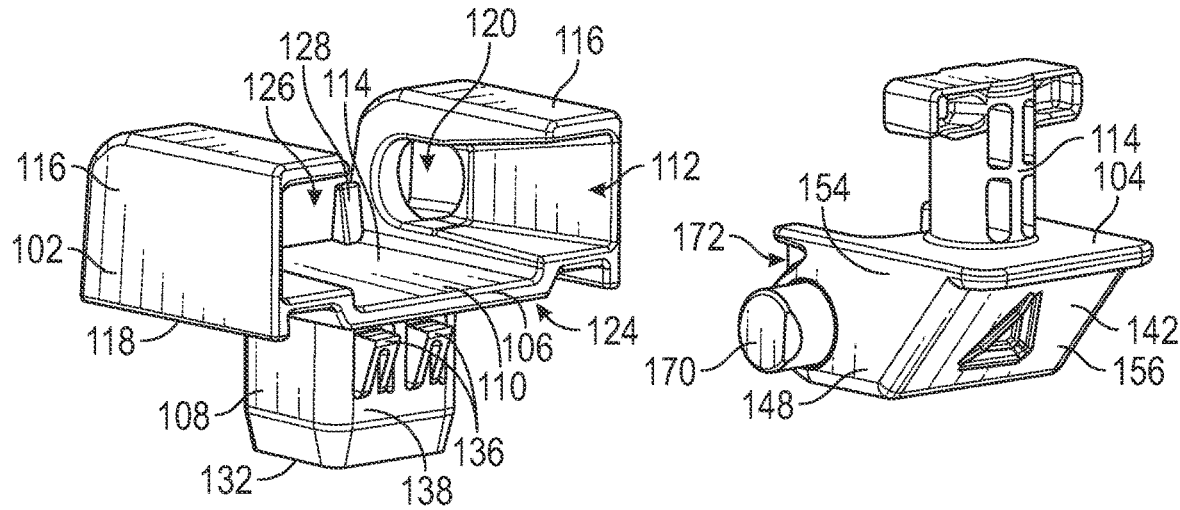
FIG. 2 is an exploded isometric view of the clip assembly of FIG. 1.

FIG. 1 illustrates a clip assembly 100 for use in a system, such as a storage system, according to an embodiment of the present disclosure. The storage system may be configured for use in a vehicle. More specifically, the clip assembly 100 according to embodiments of the present disclosure may be used with a cargo storage system for a floor of an automobile. Generally, clip assemblies according to embodiments of the present disclosure comprise a first clip and a second clip. In the illustrated embodiment, the clip assembly 100 comprises a receiver clip 102 and a floor clip 104 (i.e., an attachment clip), the receiver clip 102 being configured to removably attach or couple to the floor clip 104 such that the receiver clip 102 and the floor clip 104 are pivotable relative to each other. FIG. 2 illustrates the receiver clip 102 and the floor clip 104 in a disconnected configuration.

Figure 3:
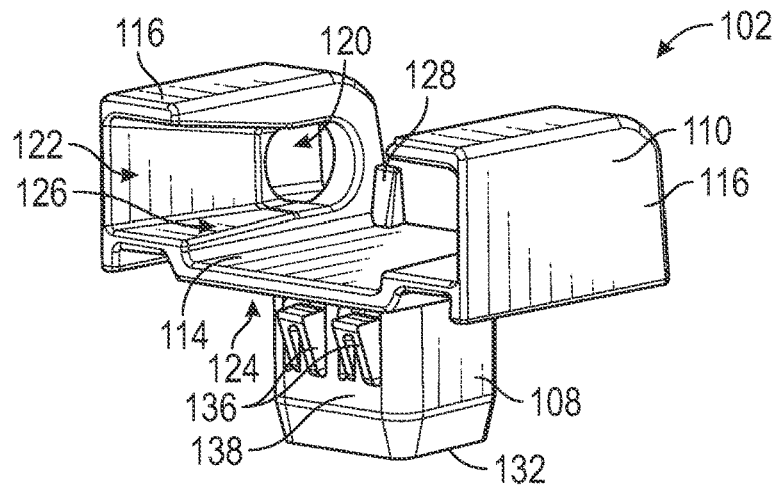
FIG. 3 is an isometric view of the receiver clip of FIG. 1 in isolation.
Figure 4:
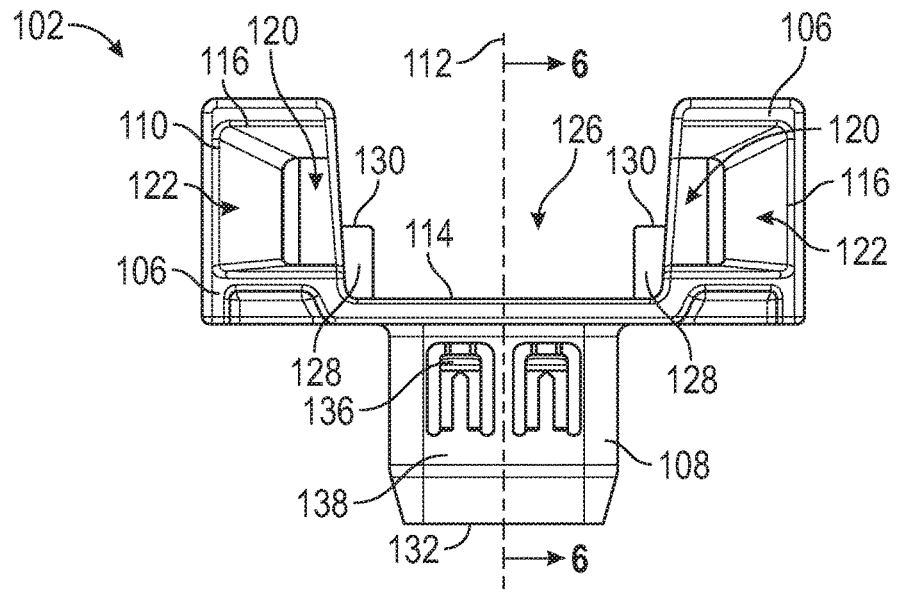
FIG. 4 is a front elevational view of the receiver clip of FIG. 3.
Figure 5:
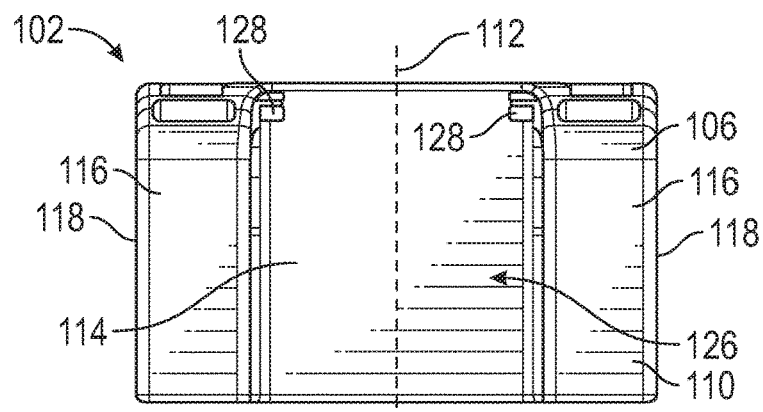
FIG. 5 is a top plan view of the receiver clip of FIG. 3.
Figure 6:
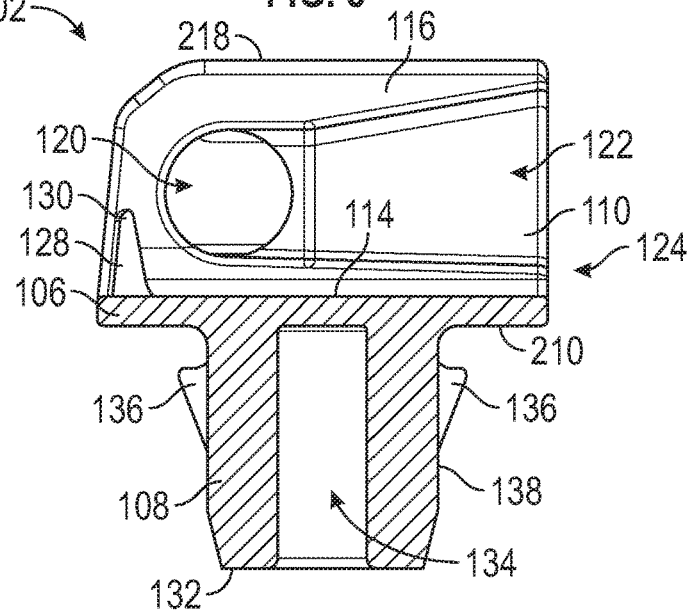
FIG. 6 is a cross-sectional view of the receiver clip of FIG. 4 taken along line 6-6.

Turning to FIG. 3, the receiver clip 102 is shown in isolation. The receiver clip 102 may be a molded component comprising a formed body 106. The body 106 may include a base section 108 and a support section 110 that are integrally formed. As best seen in FIG. 4, the body 106 may be substantially symmetrical about a center plane 112, and the support section 110 may comprise a main surface 114 and opposing arm extensions 116. As best seen in FIG. 5, the main surface 114 according to the illustrated embodiment may have a rectangular shape; however, the main surface according to alternative embodiments may have different shapes, such as, e.g., square, circular, triangular, etc. Still referring to FIG. 5, the opposing arm extensions 116 may extend from opposing edges 118 of the main surface 114 such that they are symmetrical about the center plane 112. The arm extensions 116 may be configured to connect to the floor clip 104. More specifically, as best seen in FIG. 6, which is a cross-sectional view of FIG. 4 taken along line 6-6, each of the arm extensions 116 defines a securing cavity 120 for receiving at least a portion of the floor clip 104, which will be described in greater detail below. The securing cavity 120 may generally be a recessed opening defined by each arm extension 116. Further, a guiding ramp 122 may be defined by each arm extension 116 such that the guiding ramp 122 extends from a front face 124 of the receiver clip 102 to the securing cavity 120. The guiding ramp 122 may taper from the front face 124 to the securing cavity 120. Generally, the guiding ramp 122 may be a recessed channel defined by each arm extension 116.

Returning to FIG. 4, the arm extensions 116 may extend substantially perpendicularly from the main surface 114. Consequently, a receiving region 126 may be defined in a space between the arm extensions 116, which may be configured to receive and/or accommodate a mating clip, such as the floor clip 104 (see, e.g., FIG. 2). Furthermore, the receiver clip 102 may include stops 128 disposed adjacent each of the arm extensions 116. The stops 128 may extend from and be contiguous with the arm extensions 116 and the main surface 114, and the stops 128 may be symmetrical about the center plane 112. As best seen in FIG. 6, the stops 128 may taper from adjacent the main surface 114 to distal ends 130 thereof. The general purpose of the stops 128 will be described in detail below.

The base section 108 may extend from the support section 110 to a free end 132, and the base section 108 may be configured for insertion into and connection with a component, such as a component of a storage system. As best seen in FIG. 6, the base section 108 may be a substantially rectangular extension that defines a center channel 134. Further, the base section 108 may include protrusions 136 disposed on an outer wall 138 of the rectangular extension that are configured to secure a component. In the illustrated embodiment, the base section 108 includes four protrusions 136; however, alternative embodiments may include more or fewer protrusions. Generally, the protrusions 136 may be configured to flex from an at-rest position, as shown in FIG. 6, to a deflected position in which the protrusions 136 are substantially flush with the outer wall 138.

Figure 7:
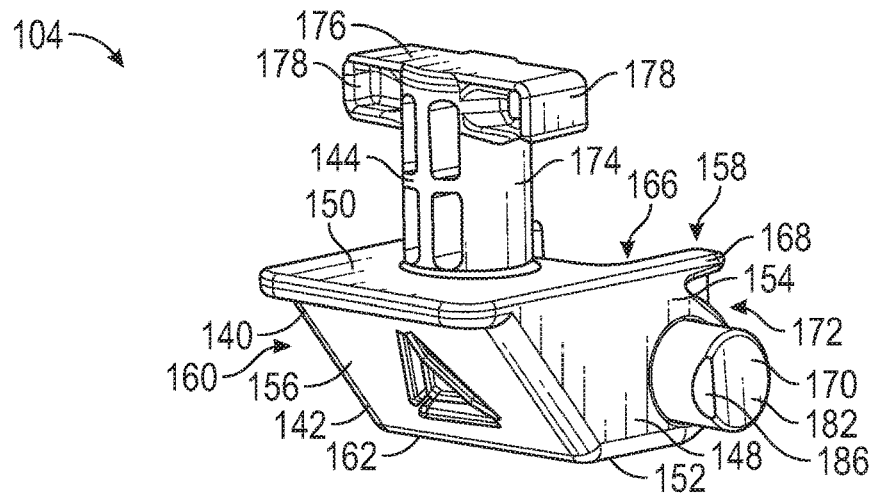
FIG. 7 is an isometric view of the floor clip of FIG. 1 in isolation.
Figure 8:
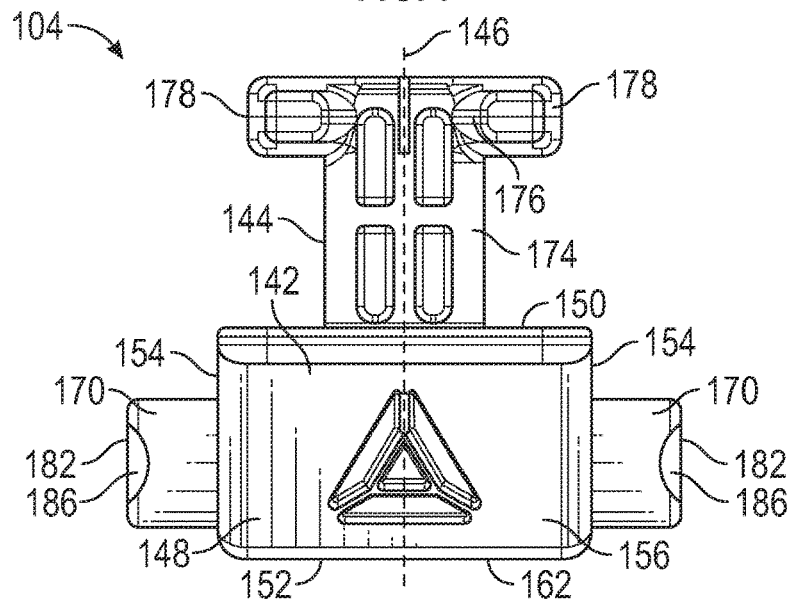
FIG. 8 is a front elevational view of the floor clip of FIG. 7.
Figure 9:
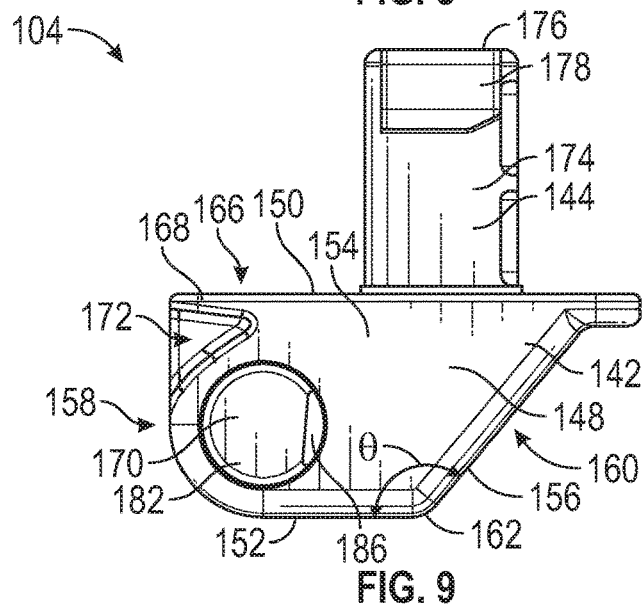
FIG. 9 is a side elevational view of the floor clip of FIG. 7.

As mentioned above, the receiver clip 102 is configured to mate with the floor clip 104, which is shown in isolation in FIG. 7. The floor clip 104 may similarly comprise a molded body 140 having a lower section 142 and an upper section 144. As best seen in FIG. 8, the molded body 140 may be symmetric about a center plane 146. The lower section 142 may include a centrally-disposed, rectangular main portion 148 having a first wall 150 and a second wall 152 that are connected on opposing sides by sidewalls 154. Further, the main portion 148 may include a front slanted wall 156 disposed between and connecting the first wall 150, the second wall 152, and the sidewalls 154. As shown in the illustrated embodiment, the sidewalls 154 may be substantially parallel to each other. Further, as best seen in FIG. 9, the first wall 150 and the second wall 152 may be substantially parallel to each other, and the front slanted wall 156 may extend from the second wall 152 to the first wall 150 such that the first wall 150 may be longer than the second wall 152. That is, the first wall 150 and the second wall 152 extend from proximate a rear side 158 toward a front side 160 so that the first wall 150 extends beyond a front edge 162 of the second wall 152. Therefore, the front slanted wall 156 may extend from the second wall 152 at an angle θ. Generally, the angle θ may be between 90 and 180 degrees. In some embodiments, the angle θ is greater than 110 degrees. In some embodiments, the angle θ is between 120 and 150 degrees.

Figure 10:
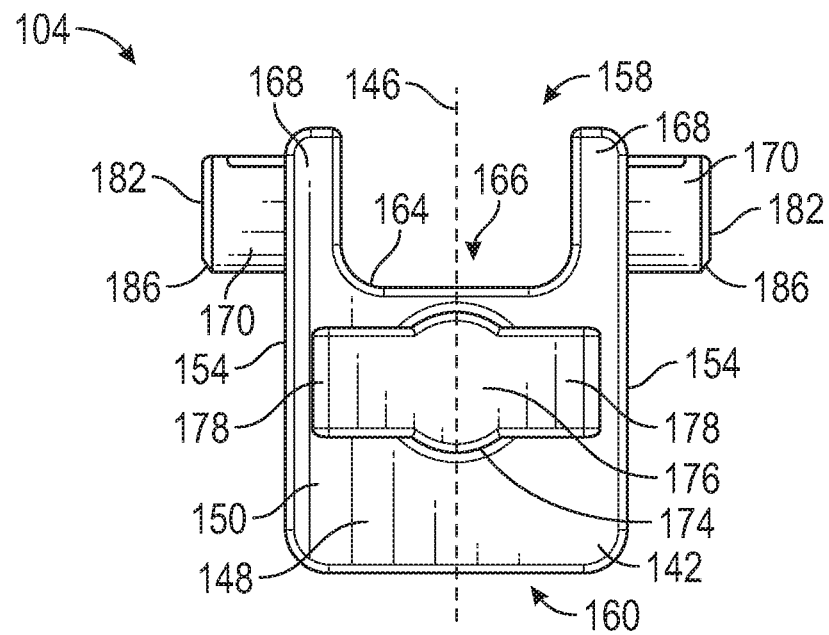
FIG. 10 is a top plan view of the floor clip of FIG. 7.

Turning now to FIG. 10, the molded body 140 further includes a U-shaped rear wall 164 that extends between the first wall 150 and the second wall 152 (see, e.g., FIG. 8). The U-shaped rear wall 164, consequently, defines a concave region 166 which may be configured to accommodate a mating component, such as the receiver clip 102 shown in FIG. 2. Further, the U-shaped rear wall 164 and the opposing sidewalls 154 together define legs 168 that extend from the rectangular main portion 148. In the illustrated embodiment, the legs 168 extend substantially parallel to each other, but they may extend at varying angles in alternative embodiments.

Still referring to FIG. 10, the floor clip 104 may further include a pair of opposing knobs 170 extending from the sidewalls 154 and the legs 168. More specifically, the knobs 170 extend from the opposing sidewalls 154 of the rectangular main portion 148 such that they are symmetrical about the center plane 146. Returning to FIG. 9, each knob 170 may be a cylindrical protrusion that extends from the sidewalls 154 of the lower section 142. In the illustrated embodiment, the knobs 170 may be disposed on the legs 168 proximate the second wall 152; however, alternative embodiments may include knobs having different positions and orientations. Further, alternative embodiments of the present disclosure may include more or fewer knobs. Moreover, as best seen in FIG. 9, each of the sidewalls 154 of the floor clip 104 defines the stop-receiving region 172, which is a recess that may be configured to receive and/or engage the stop 128 of the receiver clip 102 (see, e.g., FIG. 6), the process of which will be described in greater detail below.

Returning to FIG. 8, the upper section 144 of the floor clip 104 may include a stem 174 that extends from the first wall 150 of the floor clip 104 to a widened end 176. More specifically, the widened end 176 includes two arms 178 that oppositely extend from the stem 174 to substantially define a T-shape. The upper section 144 may be configured to removably attach to a component, such as, e.g., a component of a storage system, which will be described in greater detail below. As best seen in FIG. 10, the stem 174 may be substantially cylindrical in shape, and the opposing arms 178 may be substantially rectangular in shape. Further, in the illustrated embodiment, the stem 174 has a diameter that is greater than a width of the arms 178 such that the stem 174 slightly extends beyond the arms 178; however, alternative embodiments may include a stem and arms of different shapes and sizes.

Figure 11:
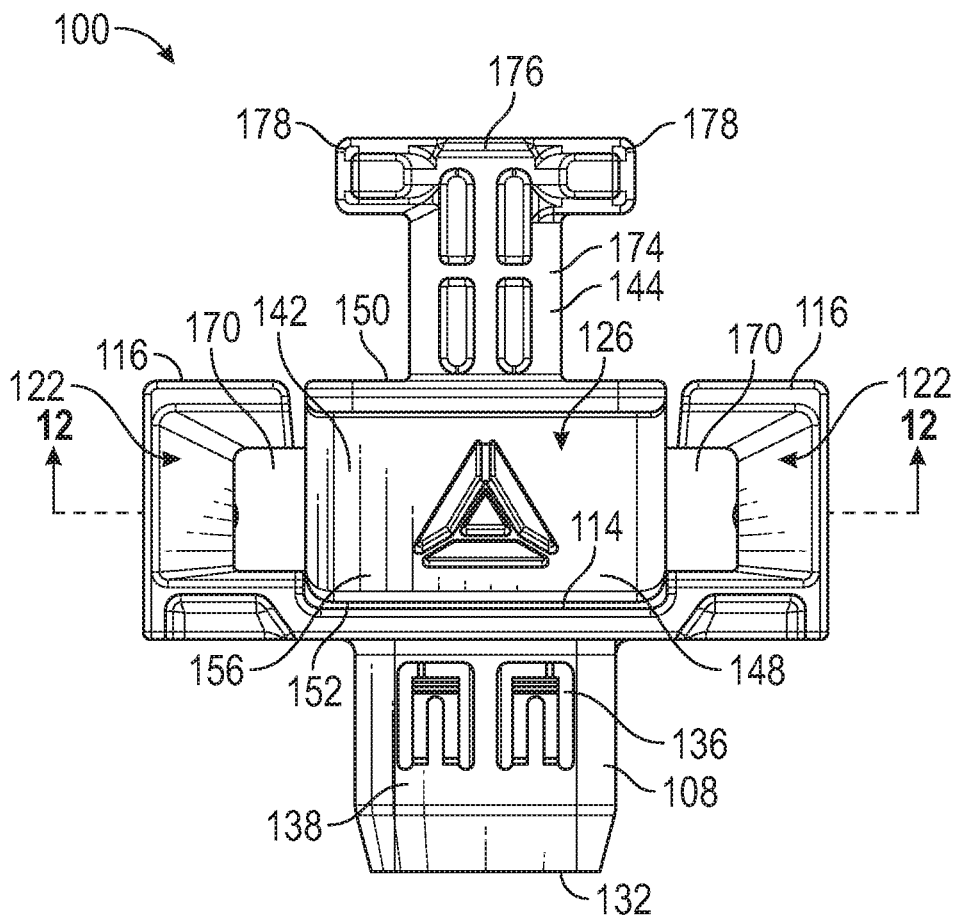
FIG. 11 is a front elevational view of the clip assembly of FIG. 1.
Figure 12:
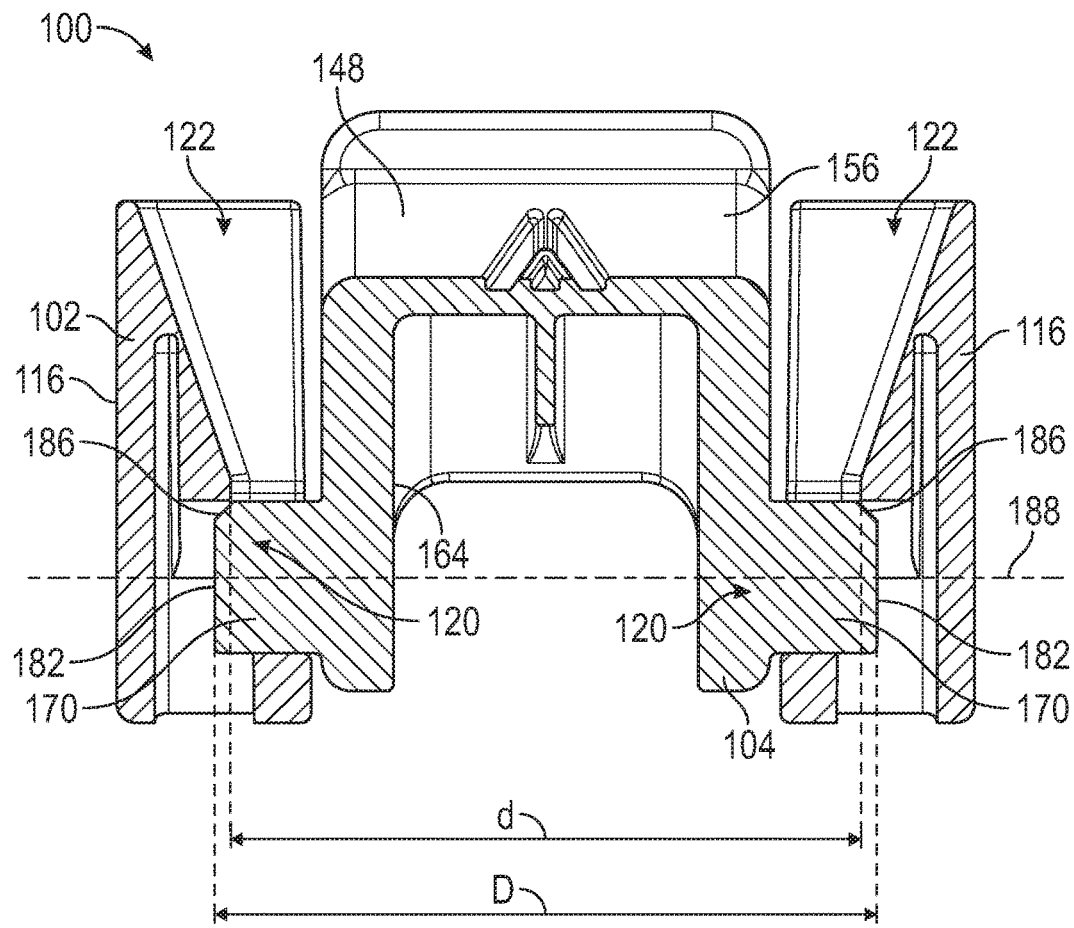
FIG. 12 is a cross-sectional view of the clip assembly of FIG. 11 taken along line 12-12.

As discussed above with reference to FIG. 2, the receiver clip 102 may be configured to couple to the floor clip 104. More specifically, the securing cavities 120 defined by the opposing arm extensions 116 of the receiver clip 102 may be configured to receive and retain the knobs 170 of the floor clip 104. Insertion of the knobs 170 into the securing cavities 120 may be done by way of the guiding ramps 122. More specifically, the guiding ramps 122 may be sized such that the knobs 170 may slide along lengths thereof with nominal force until the knobs 170 snap, click, or slide into the securing cavities 120. Thus, with reference to FIG. 12, which illustrates a cross-sectional view of the clip assembly 100 taken along line 12-12 of FIG. 11, a distance D between distal ends 182 of the knobs 170 may be greater than a distance d between portions of the guiding ramps 122 adjacent the securing cavities 120 so that unintentional removable of the knobs 170 from the securing cavities 120 is mitigated. Consequently, as best seen in FIG. 11, the receiving region 126 of the receiver clip 102 may by occupied by the lower section 142 of the floor clip 104 such that the lower section 142 of the floor clip 104 is substantially surrounded by the arm extensions 116 and the main surface 114 of the receiver clip 102.

Returning to FIG. 12, the floor clip 104 may further include angled edges 186 disposed on the distal ends 182 of the knobs 170. The angled edges 186 may allow for easier extraction or removal of the floor clip 104 from the receiver clip 102. That is, in some embodiments, the floor clip 104 and the receiver clip 102 may be connected and disconnected without tools or additional components. In some embodiments, the floor clip 104 may need to be angled at a particular degree relative to the receiver clip 102 in order to be removed. More specifically, the angled edges 186 may be disposed on only a portion of the knobs 170 such that the floor clip 104 must be angled accordingly so that the knobs 170 may be extracted from the securing cavities 120 with an appropriate level of force (e.g., by hand without the use of any tools). In the illustrated embodiment, angled edges 186 of the floor clip 104 are configured such that the floor clip 104 may be removed from the receiver clip 102 when they are in a substantially closed position, which will be described further below. Thus, in the illustrated embodiment, the angled edges 186 may be aligned with the guiding ramps 122 when the floor clip 104 and the receiver clip 102 are in the closed position.

Figure 13:
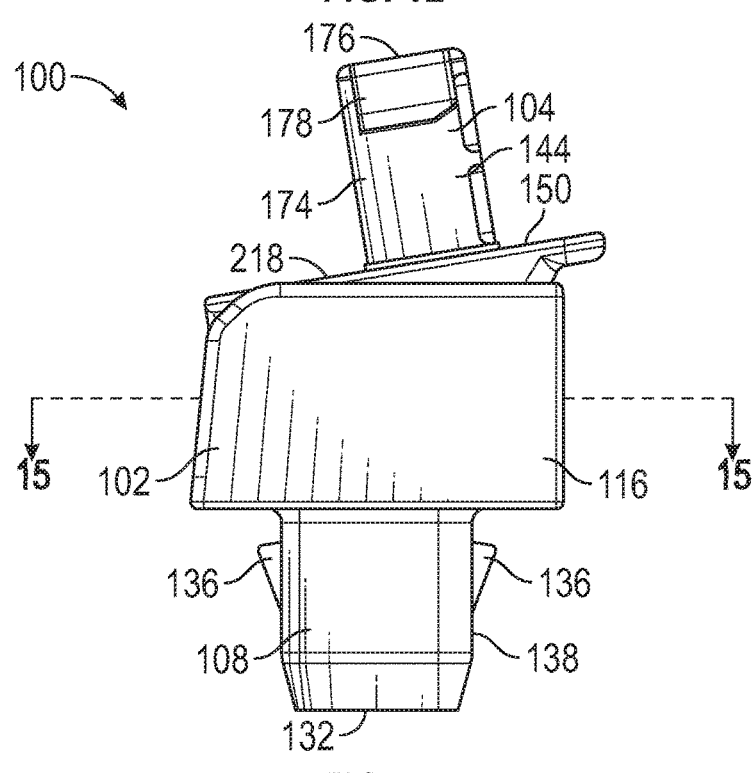
FIG. 13 is a side elevational view of the clip assembly of FIG. 1 approaching a closed position.
Figure 14:
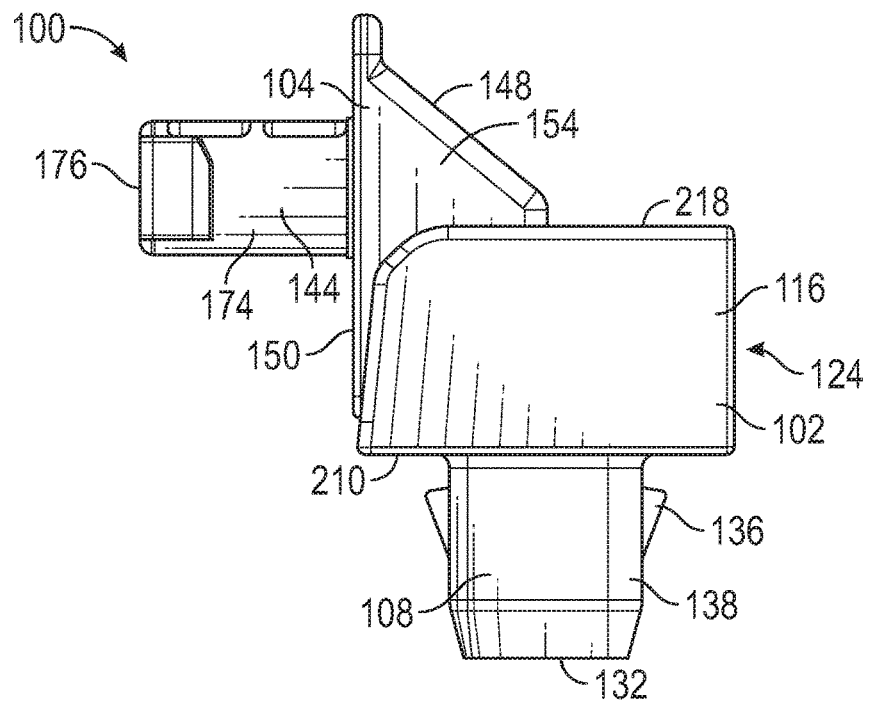
FIG. 14 is a side elevational view of the clip assembly of FIG. 1 in an open position.
Figure 15:
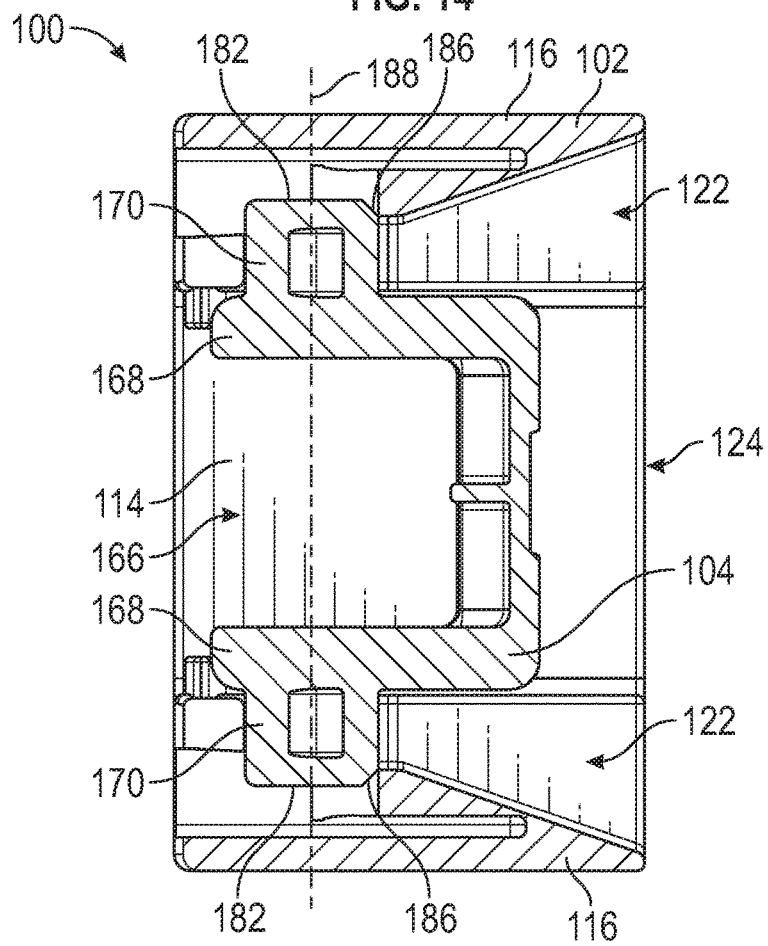
FIG. 15 is a cross-sectional view of the clip assembly of FIG. 13 taken along line 15-15.
Figure 16:
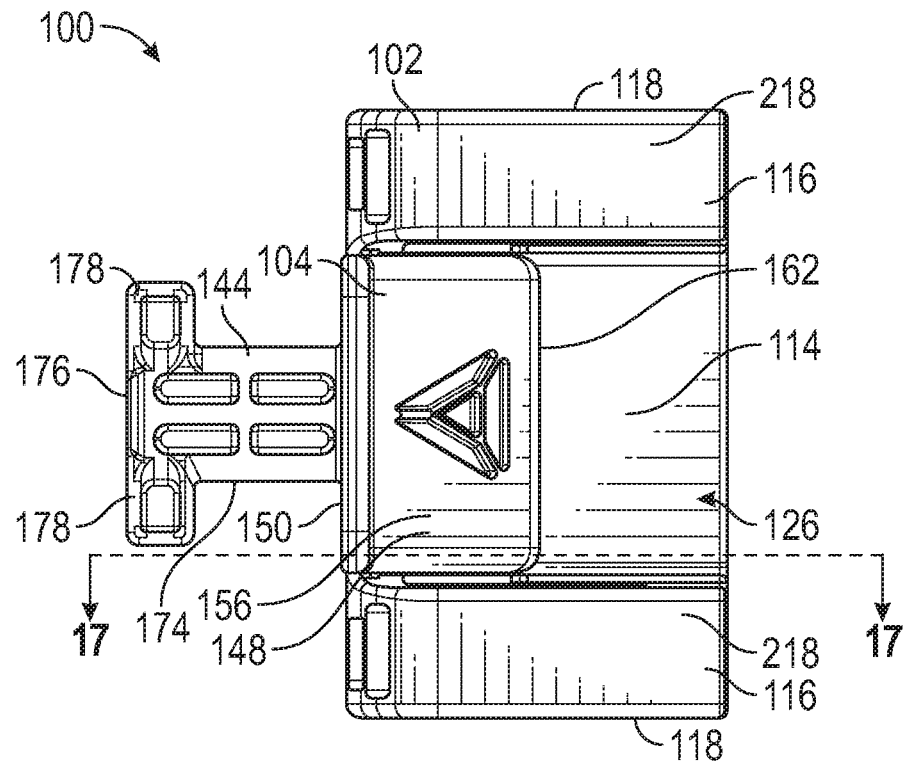
FIG. 16 is a top plan view of the clip assembly of FIG. 14 in the open position.
Figure 17:
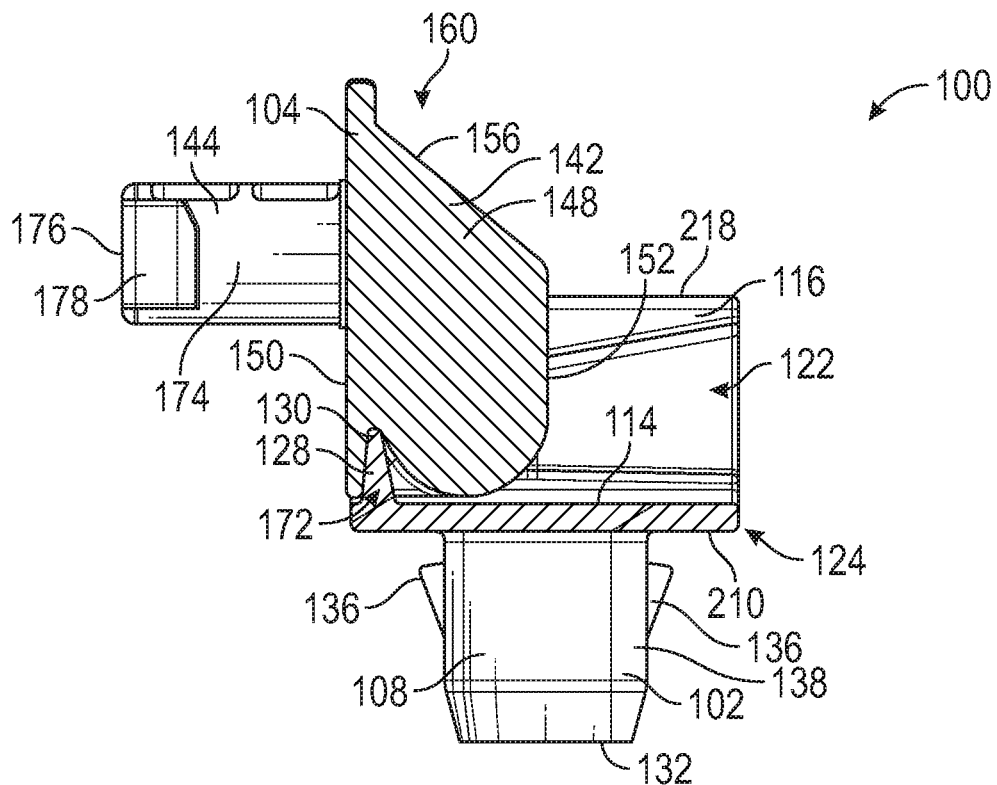
FIG. 17 is a cross-sectional view of the clip assembly of FIG. 16 taken along line 17-17.
Figure 18:
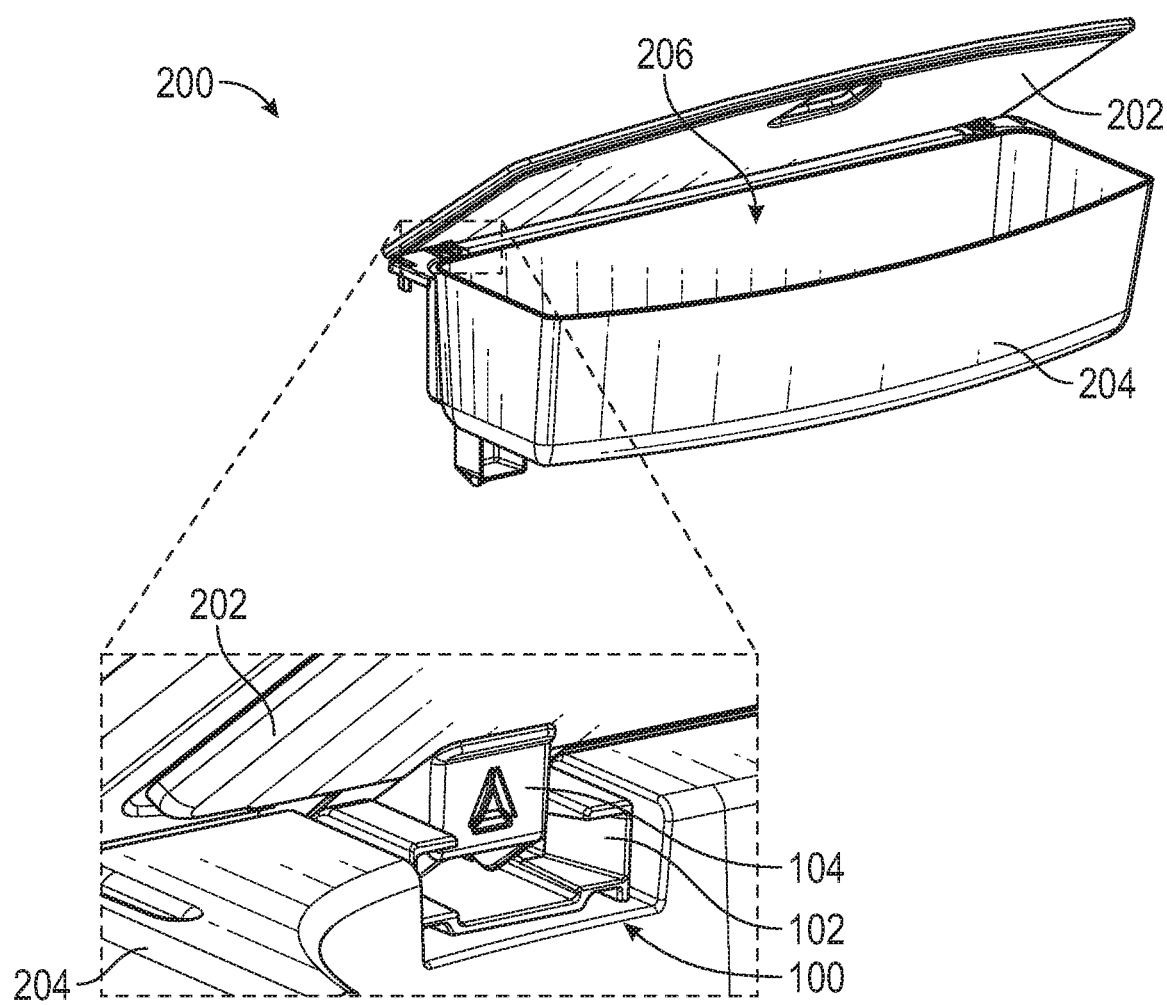
FIG. 18 is an isometric view of a storage system, including the clip assembly of FIG. 1, which includes the receiver clip and the floor clip, and a storage assembly, which includes a floor door and a storage unit, according to an embodiment of the disclosure.

The floor clip 104 and the receiver clip 102 are generally designed so that they may be pivotable relative to each other when assembled. For example, FIG. 13 illustrates the clip assembly 100 approaching the closed position, and FIG. 14 illustrates the clip assembly 100 in an open position. To move between the closed position and the open position, the floor clip 104 may pivot relative to the receiver clip 102 and about the knobs 170 (see, e.g., FIG. 12). Differently said, and referring to FIG. 17, which is a cross-sectional view of FIG. 16 taken along line 17-17, the floor clip 104 may rotate the second wall 152 of the lower section 142 away from the main surface 114 of the receiver clip 102, the floor clip 104 pivoting about a common rotational axis 188 defined by the knobs 170 and the securing cavities 120 (see, e.g., FIG. 12). The receiver clip 102 may further include the stop 128 that is configured limit rotation of the floor clip 104 or prevent the floor clip 104 from over-hinging. More specifically, the stop 128 in the illustrated embodiment is a rib that extends from the main surface 114 of the receiver clip 102 to the free end 132. The stop 128 is configured to be received by the stop-receiving region 172 of the floor clip 104 when (or as) the clip assembly 100 approaches the open position. When the stop 128 contacts or engages the floor clip 104 at the stop-receiving region 172, the clip assembly 100 may be considered to be in the open position.

FIGS. 18-29 illustrate the clip assembly 100 of FIGS. 1-17 in operation with a storage system. For example, referring particularly to FIG. 18, the clip assembly 100 may be used with a cargo storage system 200 that includes a floor door 202 hingedly attached to a storage unit 204 defining a storage cavity 206. The floor door 202 may be configured such that it is hingedly removable relative to the storage unit to permit access to the storage cavity 206.

Figure 19:
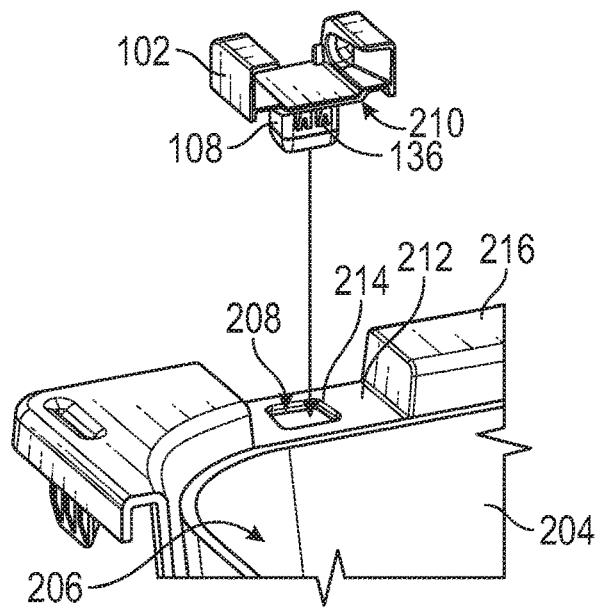
FIG. 19 is a partial exploded view of the receiver clip and the storage unit of FIG. 18.
Figure 20:
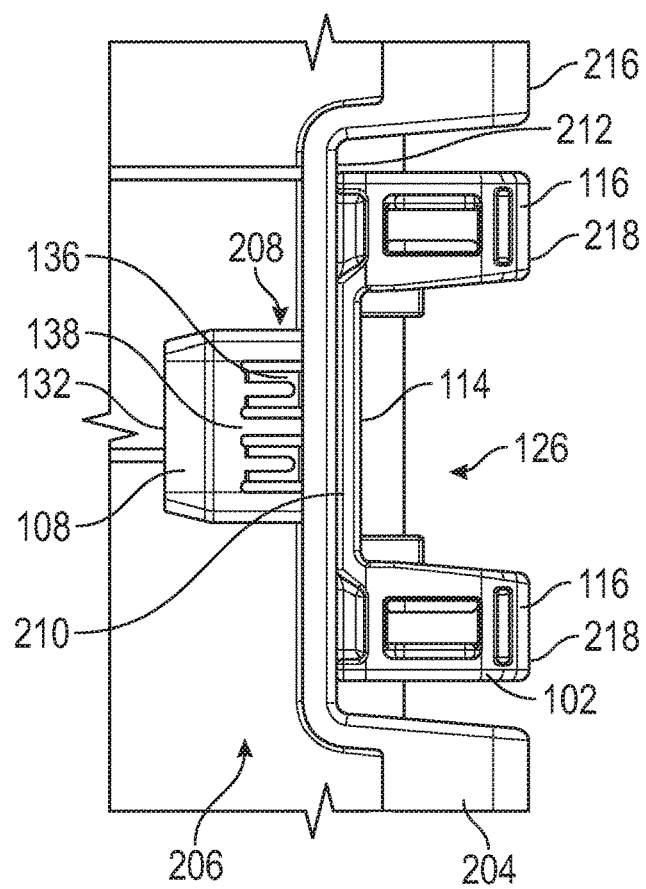
FIG. 20 is a partial front elevational view of the receiver clip and the storage unit of FIG. 19.
Figure 21:
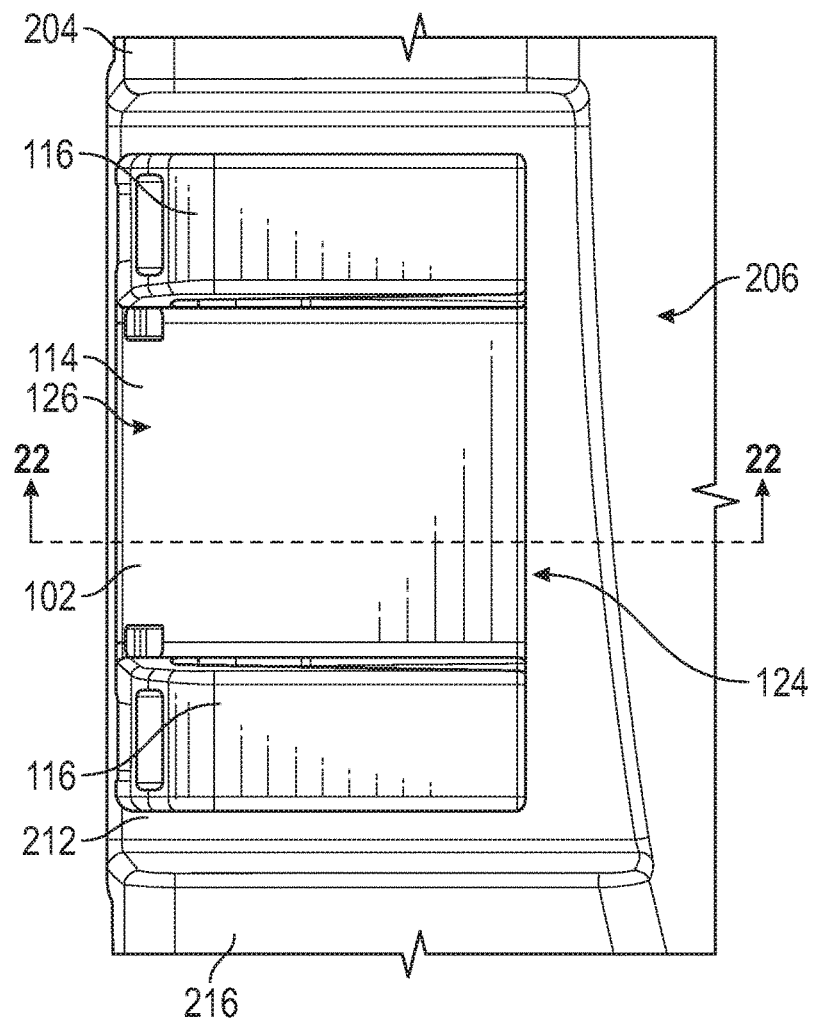
FIG. 21 is a partial top plan view of the receiver clip and the storage unit of FIG. 19.
Figure 22:
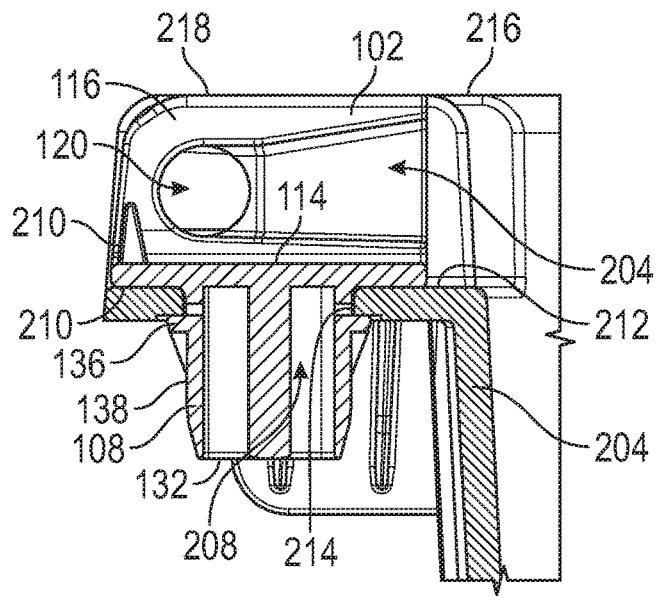
FIG. 22 is a partial cross-sectional view of the receiver clip and the storage unit of FIG. 21 taken along line 22-22.

FIG. 19 illustrates the receiver clip 102 being attached to the storage unit 204. The storage unit 204 may include an opening 208 that is configured to receive and retain the base section 108 of the receiver clip 102. More specifically, in the illustrated embodiment, the base section 108 is substantially rectangular in shape, and, accordingly, the opening 208 has a complementary shape that can accommodate the base section 108. However, in alternative embodiments, the base section 108 and the opening 208 may have different shapes, such as, e.g., square, circular, triangular, etc. Further, the opening 208 may be shaped differently than the base section 108. In embodiments where the base section 108 includes the protrusions 136, as shown in the illustrated embodiment, force may be required to fully insert the receiver clip 102 into the opening 208, i.e., until a bottom surface 210 of the receiver clip 102 abuts a contact surface 212 of the storage unit 204, which is illustrated by FIG. 20. Further, when (or as) the receiver clip 102 is being inserted into the opening 208, the protrusions 136 may deflect from an at-rest position as they pass through the opening 208. As best seen in FIG. 22, which is a cross-sectional view of FIG. 21 taken along line 22-22, once the protrusions 136 pass beyond an edge 214 of the opening 208, the protrusions 136 may return to their at-rest position so that they may engage the storage unit 204 surrounding the edge 214.

Returning to FIG. 20, in some installations, the contact surface 212 of the storage unit 204 may be recessed relative to a periphery surface 216 of the storage unit 204. Thus, in some embodiments, the arm extensions 116 of the receiver clip 102 may extend from the main surface 114 so that end surfaces 218 of the arm extensions 116 are substantially level with the periphery surface 216 of the storage unit 204, as shown in FIG. 20. However, in some embodiments, the arm extensions 116 may extend short of the periphery surface 216, or the arm extensions 116 may extend beyond the periphery surface 216.

Figure 23:
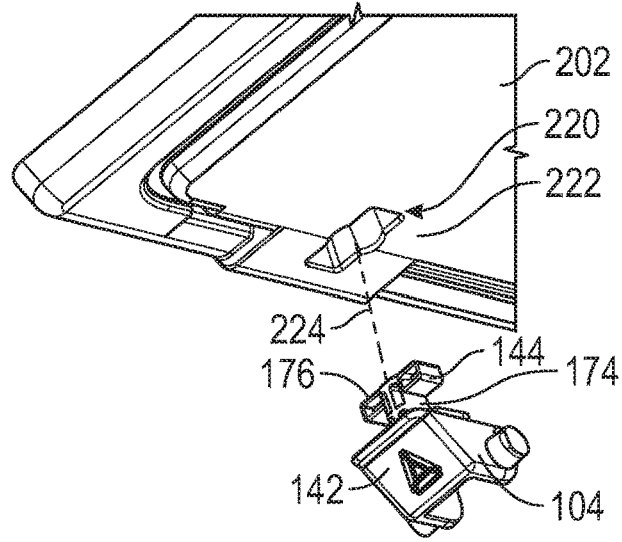
FIG. 23 is a partial exploded view of the floor clip and the floor door of FIG. 18.

FIGS. 23-26 illustrate the floor clip 104 being inserted into an opening 220 of the floor door 202. Referring particularly to FIG. 23, the opening 220 of the floor door 202 may be shaped and sized to accommodate the upper section 144 of the floor clip 104. More specifically, in the embodiment illustrated, the upper section 144 includes the widened end 176 and the cylindrical stem 174, and the opening 220 may have a complementary shape that can receive the widened end 176 and the cylindrical stem 174. Therefore, the widened end 176 and the cylindrical stem 174 may be easily inserted into and through the opening 220 of the floor door 202 when the floor clip 104 is in an insertion configuration relative to the floor door 202, as shown in FIG. 23. The floor clip 104 may be considered to be fully inserted into the opening 220 when the first wall 150 (see, e.g., FIG. 7) thereof contacts, abuts, or engages a first surface 222 of the floor door 202, as shown in FIG. 24A. To secure the floor clip 104 in the opening 220, the floor clip 104 may be rotated from the insertion configuration to a locked configuration. For example, FIGS. 24A and 24B illustrate a process of securing the floor clip 104 to the floor door 202. In FIG. 24A, the floor clip 104 is fully inserted into the opening 220, but remains in the insertion configuration. To lock the floor clip 104, the floor clip 104 may be rotated approximately 90 degrees about a longitudinal axis 224 of the opening 220 so that the floor clip 104 assumes the locked configuration.

Figure 24A:
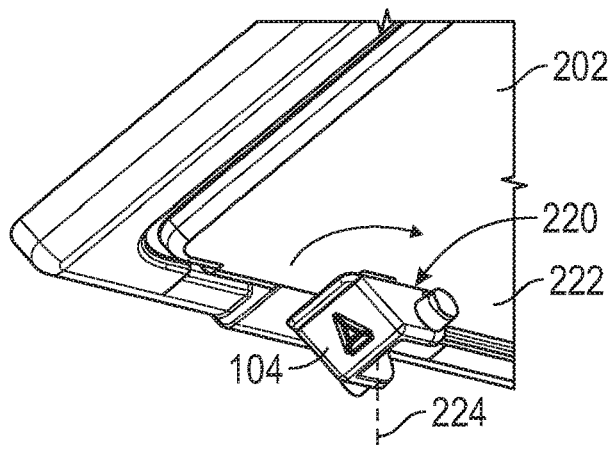
FIG. 24A is a partial isometric view of the floor clip and the floor door of FIG. 23 in an insertion configuration.
Figure 24B:
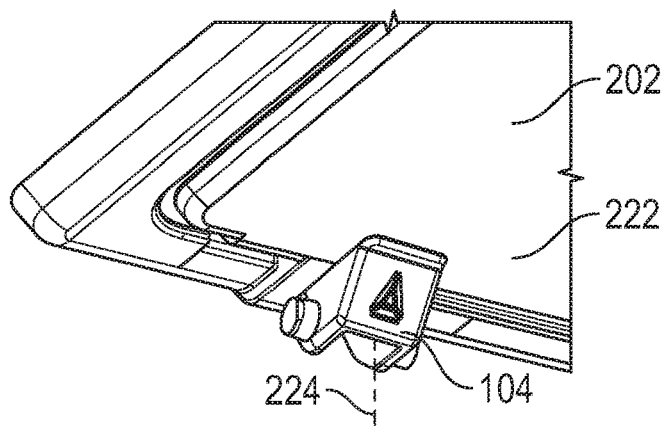
FIG. 24B is a partial isometric view of the floor clip and the floor door of FIG. 23 in a locked configuration.
Figure 26:
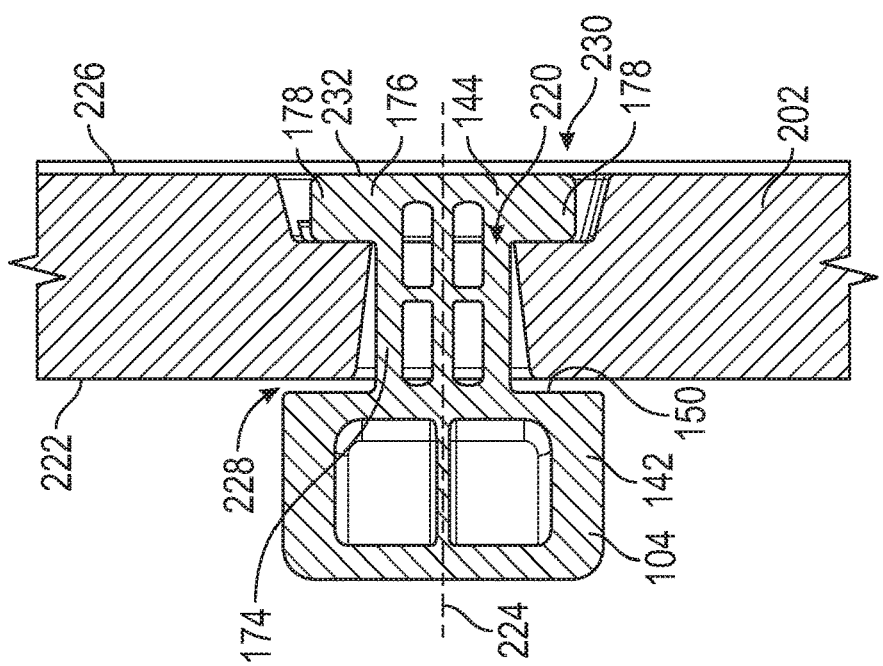
FIG. 26 is a partial cross-sectional view of the floor clip and the floor door of FIG. 25 taken along line 26-26.
Figure 25:
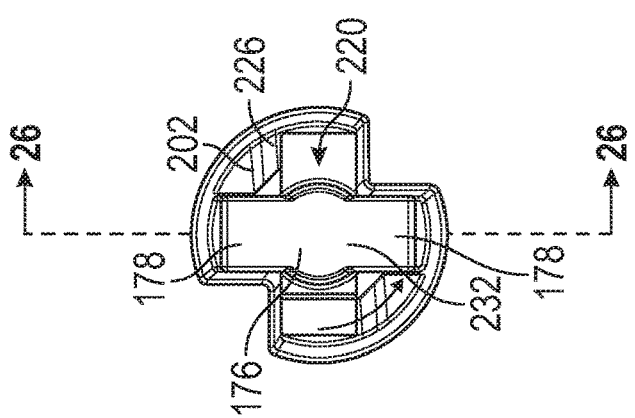
FIG. 25 is a partial bottom plan view of the floor clip and the floor door of FIG. 24B in the locked configuration.

FIG. 24B illustrates the floor clip 104 and the floor door 202 in the locked configuration. By rotating the floor clip 104, the lower section 142 thereof may prohibit the floor clip 104 from being removed from the opening 220. More specifically, as best seen in FIG. 25, once the widened end 176 has cleared the floor door 202, the floor clip 104 may rotate so that the arms 178 of the widened end 176 are adjacent a second surface 226 of the floor door 202. In some embodiments, the arms 178 of the widened end 176 may actively engage the second surface 226 of the floor door 202 when (or as) the floor clip 104 rotates from the insertion configuration to the locked configuration. In some embodiments, as shown in FIG. 26, which is a cross-sectional view of FIG. 25 taken along line 26-26, a gap 228 may exists between the first wall 150 of the lower section 142 and the first surface 222 of the floor door 202. Thus, minor movement along the longitudinal axis 224 may be permitted, but removal of the floor clip 104 from the opening 220 is prevented by the arms 178 of the upper section 144.

Figure 27:
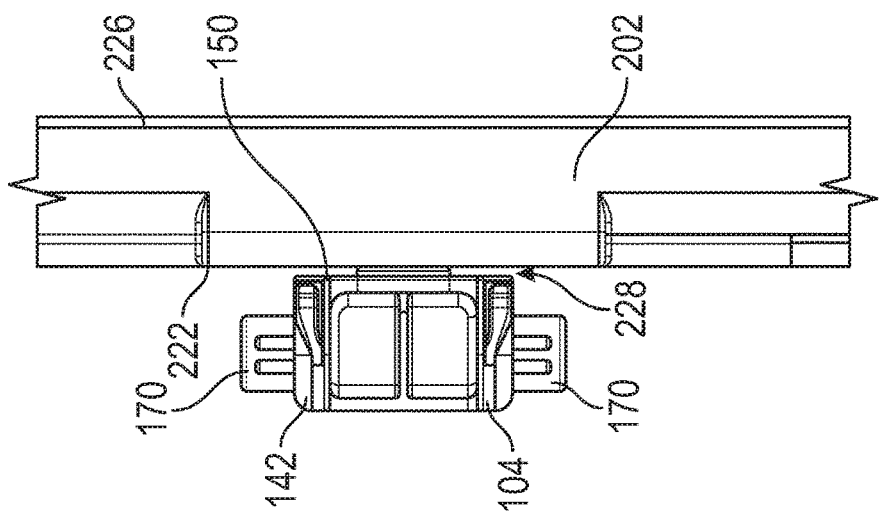
FIG. 27 is a partial front elevational view of the floor clip and the floor door of FIG. 25.

Still referring to FIG. 26, in the illustrated embodiment, the floor door 202 includes a recessed region 230 configured for the widened end 176 to occupy. Thus, in some embodiments, the stem 174 of the floor clip 104 may extend from the lower section 142 so that a distal surface 232 of the widened end 176 may be substantially level with the second surface 226 of the floor door 202, as shown in FIG. 26. However, in some embodiments, the stem 174 and/or the widened end 176 may extend short of the second surface 226, or the stem 174 and/or the widened end 176 may extend beyond the second surface 226. Turning now to FIG. 27, once the floor clip 104 is inserted into the opening 220 (not shown in FIG. 27) and is in the locked configuration, the lower section 142 may extend from the first surface 222 of the floor door 202 so that it may be coupled to the receiver clip 102.

Figure 28:
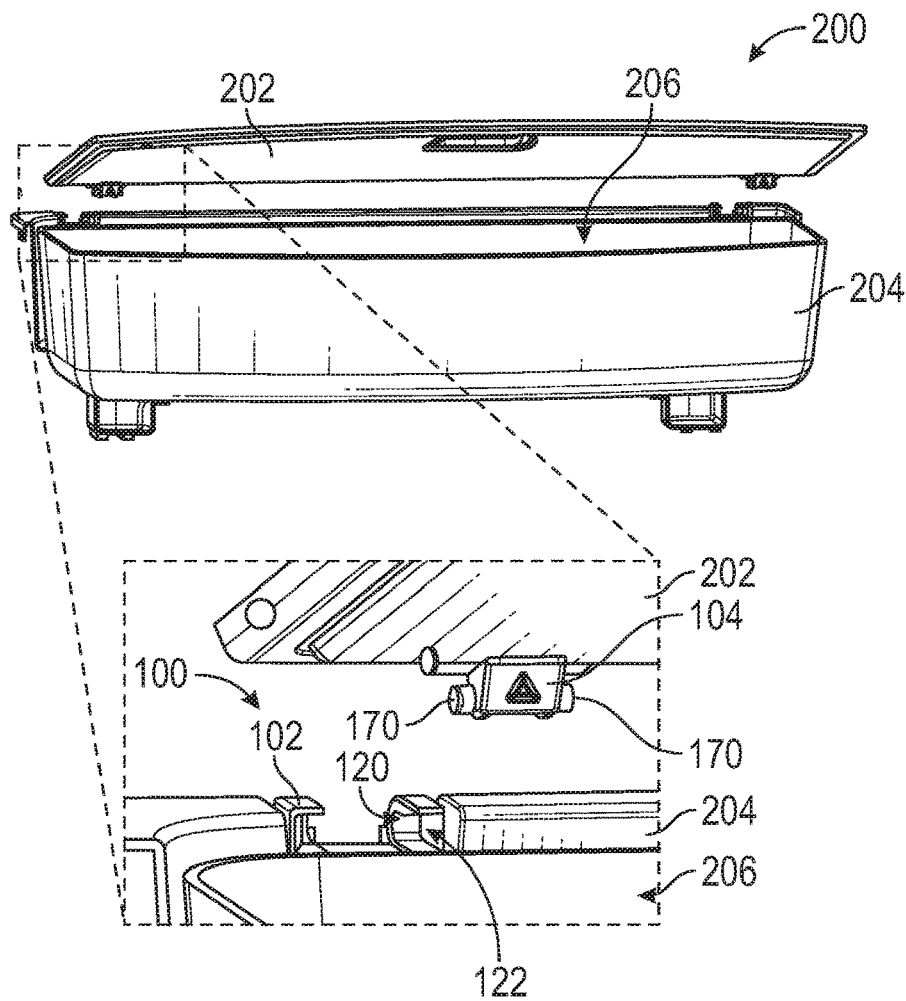
FIG. 28 is an isometric view of the storage system of FIG. 18, with the floor door and the storage unit being detached.
Figure 29:
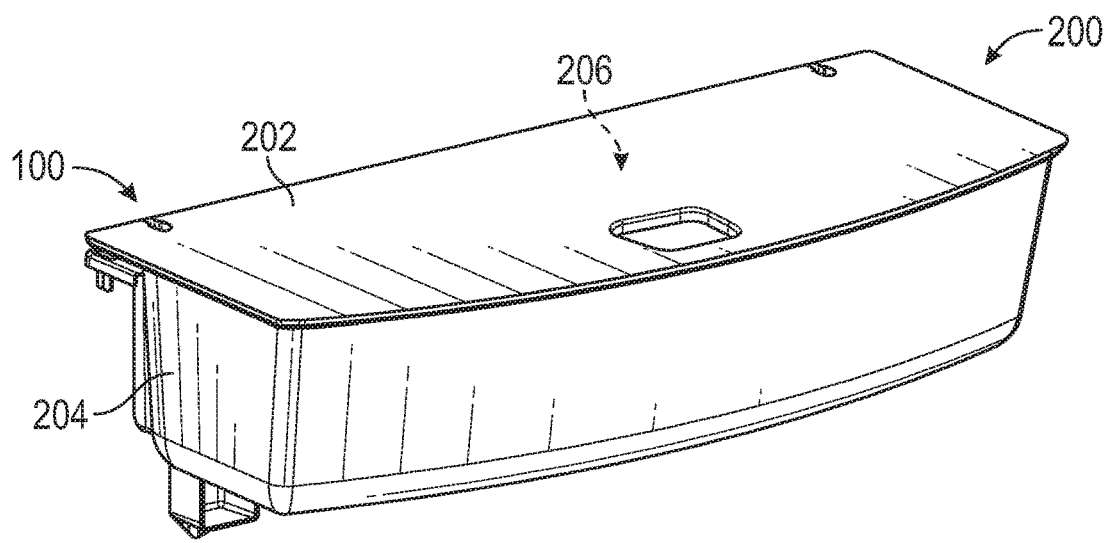
FIG. 29 is an isometric view of the storage system of FIG. 28 in a closed position.

FIG. 28 illustrates the floor clip 104 and the receiver clip 102 prior to assembly. Both the floor clip 104 and the receiver clip 102 are connected and secured to the floor door 202 and the storage unit 204, respectively. To connect the floor door 202 to the storage unit 204, the floor clip 104 and the floor door 202 may be brought near the storage unit 204 and the receiver clip 102. The floor clip 104 may be coupled to the receiver clip 102, as previously discussed, by aligning the knobs 170 of the floor clip 104 with the guiding ramps 122 of the receiver clip 102. The floor door 202 may then be forced in a direction so that the knobs 170 of the floor clip 104 advance along the guiding ramps 122 until the knobs 170 snap, click, or slide into the securing cavities 120. As a result, the floor clip 104 and, correspondingly, the floor door 202 may pivot relative to the receiver clip 102 and the storage unit 204. In this way, the clip assembly 100, which comprises the floor clip 104 and the receiver clip 102, hingedly attach the floor door 202 to the storage unit 204 so that the floor door 202 may pivot away from the storage unit 204 to an open position, which may permit access to the storage cavity 206 (see, e.g., FIG. 18). Similarly, the floor door 202 may hinge toward the storage unit 204 to a closed position, which may prohibit or obstruct access to the storage cavity 206 as shown in FIG. 29.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative embodiments of the present disclosure. The claims are to be construed to include alternative embodiments to the extent permitted by the prior art.

Various features of the disclosure are set forth in the following claims.

The invention claimed is:

1. A clip assembly for a storage system, the clip assembly comprising:
   a receiver clip including an integrally formed body comprising a base section and a support section, the support section having a main surface and a pair of arm extensions extending from opposing edges of the main surface to define a receiving region, the arm extensions each defining a guiding ramp and a securing cavity; and
   a floor clip including an integrally formed body comprising a lower section and an upper section, the lower section comprising a first wall and a second wall connected by opposing sidewalls, and knobs extending from the sidewalls,
   wherein the securing cavities of the receiver clip are configured to receive and retain at least a portion of the knobs of the floor clip, and the receiving region is configured to receive at least a portion of the floor clip,
   wherein the floor clip is configured to be hingedly connected to the receiver clip by the knobs such that the floor clip may pivot relative to the receiver clip between an open position and a closed position,
   wherein the receiver clip further includes stops disposed adjacent each arm extension, the stops extend continuously from the arm extensions and the main surface;
   wherein the stops taper from adjacent the main surface to distal ends of the stops;
   wherein each of the sidewalls of the floor clip defines a stop-receiving region that is configured to receive and/or engage the stop of the receiver clip; and
   wherein the stop-receiving regions are configured to receive the stops when the clip assembly approaches the open position.

2. The clip assembly of claim 1, wherein each of the securing cavities is a recessed opening defined by each arm extension.

3. The clip assembly of claim 2, wherein the guiding ramp is a recessed channel that extends from a front face of the receiver clip to the securing cavity.

4. The clip assembly of claim 3, wherein the guiding ramp tapers from the front face to the securing cavity.

5. The clip assembly of claim 1, wherein the base section of the receiver clip extends from the support section to a free end and is configured for insertion into an opening defined in the storage system.

6. The clip of claim 5, wherein the base section comprises protrusions disposed on an outer wall thereof, wherein the protrusions are configured to deflect from an at-rest position as the base section passes through the opening of the storage system, and wherein the protrusions are configured to return toward the at-rest position when the base section is inserted into the opening.

7. The clip assembly of claim 6, wherein the upper section of the floor clip includes a stem that extends from the lower section to a widened end and is configured for insertion into an opening defined by the storage system,
   wherein the floor clip further includes a U-shaped rear wall disposed between the sidewalls and between the first wall and the second wall, and
   wherein the U-shaped rear wall and the opposing sidewalls together define legs that extend from the main portion, and wherein the knobs extend from the sidewalls at the legs.

8. A clip assembly for a storage system, the storage system comprising a door and a storage unit, the storage unit defining a storage cavity, the clip assembly comprising:
   a receiver clip including a body comprising a support section with a main surface and arm extensions extending from the main surface to define a receiving region, the arm extensions each defining a guiding ramp and a securing cavity, the guiding ramp being a recessed channel that extends from a front face of the receiver clip to the securing cavity; and
   a floor clip including a body comprising a lower section with a first wall and a second wall connected by opposing sidewalls, a front slanted wall that is spaced from an outer edge of the first wall and extends between the opposing sidewalls, the lower section further including cylindrical knobs extending from the sidewalls thereof,
   wherein the securing cavities of the receiver clip are configured to receive and retain at least a portion of the knobs of the floor clip, and the receiving region is configured to receive at least a portion of the floor clip,
   wherein the floor clip is hingedly connected to the receiver clip by the knobs such that the floor clip may pivot relative to the receiver clip, and
   wherein the clip assembly is configured to hingedly connect the door to the storage unit of the storage system such that the door may pivot relative to the storage unit, and
   wherein the receiver clip further includes stops disposed adjacent each arm extension, the stops extend continuously from the arm extensions and the main surface;
   wherein the stops taper from adjacent the main surface to distal ends of the stops;

wherein each of the sidewalls of the floor clip defines a stop-receiving region that is configured to receive and/or engage the stop of the receiver clip, and wherein the stop-receiving regions are configured to receive the stops when the clip assembly approaches an open position.

9. The clip assembly of claim 8, wherein a distance between distal ends of the knobs is greater than a distance between portions of the guiding ramps adjacent the securing cavities.

10. The clip assembly of claim 8, wherein the receiver clip further includes a base section integrally formed with the support section, the base section of the receiver clip extending from the support section to a free end, and which is configured for insertion into an opening defined by the storage unit.

11. The clip assembly of claim 10, wherein the base section comprises protrusions extending outwardly from an outer wall of the base section, the protrusions being configured to deflect from an at-rest position toward a deflected position.

12. The clip assembly of claim 11, wherein the protrusions are configured to deflect from the at-rest position toward the deflected position as the base section passes through the opening of the storage unit, and wherein the protrusions are configured to return toward the at-rest position when the base section is inserted into the opening so that the protrusions engage the storage unit and secure the receiver clip to the storage unit.

13. The clip assembly of claim 8, wherein the floor clip further includes an upper section having a stem that extends from the first wall to a widened end, and wherein the stem and the widened end are configured to be inserted into an opening defined by the door to secure the floor clip to the door.

14. The clip assembly of claim 13, wherein the floor clip is configured to be rotated from an insertion configuration to a locked configuration to secure the floor clip to the door.

15. A cargo storage system for a vehicle, the cargo storage system comprising:
   a storage assembly including a storage unit and a floor door, the storage unit defining a storage cavity and an opening, and the floor door defining an opening; and
   a clip assembly including a first clip and a second clip, wherein the first clip includes an integrally formed body comprising a base section and a support section, the support section having a main surface and a pair of arm extensions extending from opposing edges of the main surface to define a receiving region, the main surface including a pair of stops extending perpendicular from the main surface, the arm extensions each defining a guiding ramp and a securing cavity, wherein the base section of the first clip extends from the support section to a free end and is configured for insertion into an opening of the storage unit, the base section comprising protrusions disposed on an outer wall thereof, the protrusions being configured to deflect from an at-rest position as the base section passes through the opening of the storage unit, and the protrusions being configured to return toward the at-rest position when the base section is inserted into the opening so that the protrusions engage the storage unit and secure the first clip to the storage unit, wherein the second clip includes an integrally formed body comprising a lower section and an upper section, the lower section comprising a first wall and a second wall connected by opposing sidewalls, the lower section further includes knobs extending from the sidewalls thereof, the upper section including a stem that extends from the first wall to a widened end, wherein the stem and the widened end are configured to be inserted into the opening of the floor door to secure the second clip to the floor door, wherein the securing cavities are configured to receive and retain at least a portion of the knobs of the second clip, and the receiving region is configured to receive at least a portion of the second clip, and wherein the second clip is configured to be hingedly connected to the first clip by the knobs such that the second clip and the floor door can pivot relative to the first clip and the storage unit, and wherein the first clip further includes stops disposed adjacent each arm extension, the stops extend continuously from the arm extensions and the main surface;

wherein the stops taper from adjacent the main surface to distal ends of the stops;

wherein each of the sidewalls of the second clip defines a stop-receiving region that is configured to receive and/or engage the stop of the first clip, and wherein the stop-receiving regions are configured to receive the stops when the clip assembly approaches an open position.

16. The cargo storage system of claim 15, wherein the floor door and the second clip are configured to pivot relative to the first clip and the storage cavity between a closed position and an open position, wherein the floor door obstructs access to the storage cavity in the closed position, and wherein the floor door permits access to the storage cavity in the open position.

* * * * *